United States Patent
Lee et al.

(10) Patent No.: US 10,270,184 B2
(45) Date of Patent: Apr. 23, 2019

(54) CONTROL MODULE AND MULTIPLE-ANTENNA DEVICE HAVING THE SAME

(71) Applicant: HONGBO WIRELESS COMMUNICATION TECHNOLOGY CO., LTD., Taipei (TW)

(72) Inventors: Ming-Chia Lee, Taipei (TW); Yu-Lin Shih, Taipei (TW); Hong-Fang Yan, Taipei (TW)

( * ) Notice: Subject to any disclaimer, the term of this patent is extended or adjusted under 35 U.S.C. 154(b) by 21 days.

(21) Appl. No.: 15/838,051

(22) Filed: Dec. 11, 2017

(65) Prior Publication Data

US 2019/0089066 A1    Mar. 21, 2019

(30) Foreign Application Priority Data

Sep. 19, 2017 (TW) .............................. 106132374 A

(51) Int. Cl.
| | | |
|---|---|---|
| *H01Q 21/06* | (2006.01) | |
| *H01Q 19/10* | (2006.01) | |
| *H01Q 13/10* | (2006.01) | |
| *H01Q 9/16* | (2006.01) | |
| *H04B 7/06* | (2006.01) | |
| *H04W 72/08* | (2009.01) | |
| *H04L 5/00* | (2006.01) | |

(52) U.S. Cl.
CPC ............ *H01Q 21/06* (2013.01); *H01Q 19/10* (2013.01); *H01Q 9/16* (2013.01); *H01Q 13/10* (2013.01); *H04B 7/06* (2013.01); *H04L 5/006* (2013.01); *H04W 72/08* (2013.01)

(58) Field of Classification Search
None
See application file for complete search history.

(56) References Cited

U.S. PATENT DOCUMENTS

| | | | |
|---|---|---|---|
| 7,477,204 B2 | 1/2009 | Lin et al. | |
| 7,696,946 B2 | 4/2010 | Shtrom | |
| 9,947,996 B2 * | 4/2018 | Chou | .................... H01Q 1/245 |
| 2009/0115681 A1 * | 5/2009 | Lai | ........................... H01Q 3/26 |
| | | | 343/850 |

(Continued)

*Primary Examiner* — Kodzovi Acolatse
(74) *Attorney, Agent, or Firm* — OPES IP Consulting Co., Ltd.

(57) ABSTRACT

A control module is installed in a multi-antenna device having a wireless chip, and comprises a multi-antenna system, an antenna control unit, an application unit and a microprocessor. The multi-antenna system comprises antenna units. Each antenna unit comprises a main antenna and a reflecting unit, with the main antenna generating a radiation pattern in a single polarization direction, and the reflecting unit parallel to the single polarization direction and partially surrounding the main antenna. When a diode is conducted, the reflecting unit forms a rectangular closed slot structure as a reflector of the main antenna; conversely, the reflecting unit does not serve as the reflector. According to the signal strength or data receiving rates of the antenna units, the application unit controls the microprocessor to associate with an algorithm processing procedure to determine whether to conduct the diode for changing a radiation pattern of the multi-antenna system.

10 Claims, 6 Drawing Sheets

(56) References Cited

U.S. PATENT DOCUMENTS

2010/0253349 A1* 10/2010 Cork .................. G01R 33/3692
   324/318
2014/0375501 A1* 12/2014 Nikitin .................. H01Q 1/245
   342/367

* cited by examiner

CONTROL MODULE AND MULTIPLE-ANTENNA DEVICE HAVING THE SAME

CROSS-REFERENCE TO RELATED APPLICATIONS

This non-provisional application claims priority under 35 U.S.C. § 119(a) on Patent Application No(s). 106132374 filed in Taiwan R.O.C. on Sep. 19, 2017, the entire contents of which are hereby incorporated by reference.

BACKGROUND

Technical Field

This disclosure relates to a wireless transmission technique, and particularly relates to a control module for enhancing wireless transmission performance and a multi-antenna device comprising the control module.

Related Art

To develop a wireless network and mobile communication device with high-speed transmission capability has been the goal of the related industries, and the data rates of various wireless transmission protocols are continuously enhanced. For example, regarding the IEEE 802.11 protocol in a wireless local area network, it is developed from the 802.11a protocol which has the maximum of the raw data rate of 54 Mbps in the early period to the 802.11ac protocol which is widely used and has a single channel rate of at least 500 Mbps. As the future goal in the field of mobile communication, the protocol of the future and hot fifth-generation communication system (5G) is defined to have an amazing data rate of 1 Gbps.

However, the implementation of a wireless transmission protocol requires not only a digital chip with sufficient computing capability for encoding and decoding signals, but also an improved radio frequency (RF) circuit associated with an antenna (or antenna system) having a sufficient bandwidth and high efficiency. In practice, the upper limit of the actual data rate of the wireless product provided by a wireless product provider is limited not only by the performance limitations of various RF components, analog modules and digital modules, but also by the conformity between the hardware (component and module) and the software (algorithm). In the conventional wireless transmission process, the increase or decrease of the wireless data rate is decided by the control and channel state (external transmission condition) of the wireless chip, and the RF component and the antenna component cannot decide it. There are many limitations to finding solutions for enhancing the data rate by merely considering the wireless chip.

SUMMARY

According to one or more embodiments of this disclosure, a control module is configured to be installed in a multi-antenna device which has a wireless chip, and the control module comprises a multi-antenna system, an antenna control unit, an application unit and a microprocessor. The multi-antenna system comprises a plurality of antenna units which are configured to connect to the wireless chip of the multi-antenna device. Each of the plurality of antenna units comprises a main antenna and a first reflecting unit, wherein the main antenna is configured to generate a radiation pattern in a single polarization direction, and the first reflecting unit is parallel to the single polarization direction and partially surrounds the main antenna. The first reflecting unit comprises a first upper metal plate, a first lower metal plate, a first capacitor and a first diode, wherein when the first diode is conducted, the first upper metal plate, the first lower metal plate, the first capacitor and the first diode form a first rectangular closed slot structure as a reflector of the main antenna, and when the first diode is not conducted, the first upper metal plate, the first lower metal plate, and the first capacitor forms a first rectangular open slot structure which does not serve as the reflector of the main antenna. The antenna control unit is electrically connected to the first diode of each of the plurality of antenna units, and configured to output a plurality of first direct current control voltages. The plurality of first direct current control voltages respectively corresponds to the plurality of antenna units, and each of the plurality of direct current control voltages is configured to conduct the corresponding first diode. The application unit obtains signal strength of the plurality of antenna units or data receiving rates respectively corresponding to the plurality of antenna units from the wireless chip. The microprocessor is connected to the antenna control unit, and controlled by the application unit. According to the signal strength or the data receiving rates and associating with an algorithm processing procedure, the microprocessor controls the antenna control unit to conduct or not to conduct the first diode of at least one of the plurality of antenna units for changing a radiation pattern of the multi-antenna system so as to enhance communication performance.

According to one or more embodiments of this disclosure, a multi-antenna device comprises a control module as aforementioned and a wireless chip. The wireless chip is connected to the main antenna of each of the plurality of antenna units, obtains signals of the plurality of antenna units, and obtains the signal strength of the plurality of the antenna units or the data receiving rates corresponding to the plurality of antenna units.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In one or more embodiments of this disclosure, the type of the wireless protocol used in the wireless communication of a multi-antenna device which has a control module is not limited. For example, the multi-antenna device can be applied to IEEE 802.11 protocol, Bluetooth protocol, long-term evolution protocol or oncoming 5G protocol. The multi-antenna device described in one or more embodiments of this disclosure may be implemented in various forms. For example, the multi-antenna device can be a notebook, laptop, tablet, all-in-one personal computer, smart television, small cell, wireless router or smart phone, but is not limited to these. Each antenna unit and antenna component of the multi-antenna device is not limited to be exposed or embedded.

Figure 1:
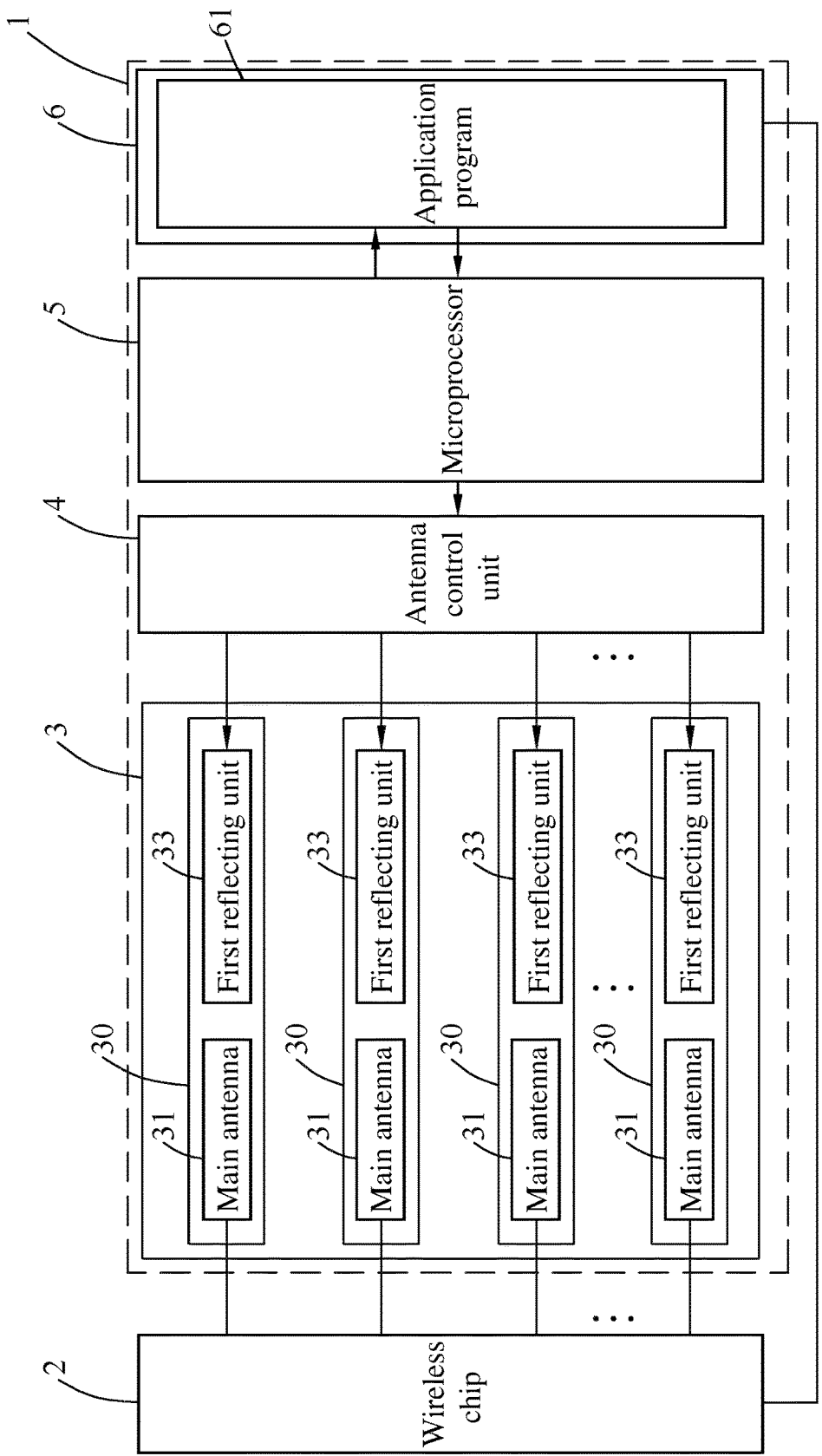
FIG. 1 is a functional block diagram of a control module of a multi-antenna device having a wireless chip provided in an embodiment of this disclosure.

Please refer to FIG. 1 which is a functional block diagram of a control module of a multi-antenna device having a wireless chip provided in an embodiment of this disclosure. The control module 1 comprises a multi-antenna system 3, an antenna control unit 4, an application unit 61 and a microprocessor 5. The multi-antenna system 3 has a plurality of antenna units 30. The antenna units 30 are configured to connect to the wireless chip 2 of the multi-antenna device. Each antenna unit 30 comprises a main antenna 31 and a first reflecting unit 33. The main antenna 31 is configured to generate a radiation pattern in a single polarization direction. The antenna unit 30 is described later in the embodiment of FIG. 2A. The microprocessor 5 is connected to the antenna control unit 4, and controlled by the application unit 61. The wireless chip 2 is connected to each antenna unit 30 of the multi-antenna system 3 of the control module 1 to obtain signals of the plurality of antenna units 30, and to obtain the strength of the signals of the plurality of antenna units 30 or data receiving rates respectively corresponding to the plurality of antenna units. The wireless chip 2 transmits the signal strength of the antenna units 30 or the data receiving rate corresponding to the antenna units 30 to the application unit 61 in the application layer 6. The application layer 6 is based on the application layer of the operating system of the system architecture of a multi-antenna device. The wireless chip 2 does not change the signal transmitting/receiving capabilities of the plurality of antenna units 30 (e.g. antenna efficiency, radiation pattern and/or another antenna parameter). The wireless chip 2 merely considers the plurality of antenna units 30 to be the components for receiving signals, and transmits or receives wireless signals via the plurality of antenna units 30. The signal transmitting/receiving capabilities of the plurality of antenna units 30 (e.g. antenna efficiency, radiation pattern and/or another antenna parameter) are determined to change or not to change by the antenna control unit 4. The application unit 61 obtains the signal strength of the antenna units 30 or the data receiving rate corresponding to the antenna units 30 from the wireless chip 2. For example, the application unit 61 can be a processor executing a program for algorithm of the control module 1. The microprocessor 5 follows the instruction of the application unit 61 to control the antenna control unit 4 to conduct or not to conduct the first diode 334 (shown in FIG. 2A rather than FIG. 1) according to the signal strength of the antenna units 30 and the data receiving rates corresponding to the antenna units 30 and associating with an algorithm processing procedure, in order to change the radiation pattern of the multi-antenna system 3 so as to enhance the communication performance. The algorithm processing procedure can operate in the application unit 61 in a software form, or can be firmware stored in the microprocessor 5. Moreover, in an embodiment, the above antenna units 30 are formed in a specific geometric arrangement. The arrangement can be determined based on the product application. For example, the antenna units 30 are arranged inside the shell of the multi-antenna device, or arranged in a line or as a rectangle outside the shell of the multi-antenna device. Each of the antenna units 30 changes the radiation pattern of the main antenna thereof by a switching, scanning or adaptive method. In this kind of application, the above algorithm procedure includes switching the main antenna 31. Switching the main antenna 31 can change the directivity, antenna efficiency, impedance bandwidth or another control factor of antenna performance, but switching the main antenna 31 cannot change the polarization direction of the main antenna 31.

Moreover, the application unit 61 can also obtain the situation of the control of each antenna unit 30 by the antenna control unit 4 from the microprocessor 5. For example, a research and development (RD) personnel or user of the multi-antenna device can monitor the selection result and the operation mode of the antenna. The application unit 61 can be the software of the application layer 6 belonging to the open systems interconnection reference model (OSI model). The application unit 61 can be implemented purely based on the operating system of the multi-antenna device, or the application unit 61 can involve not only the software implemented in the operating system of the multi-antenna device but also the software for externally monitoring the operation of the multi-antenna device and remotely setting and monitoring the multi-antenna device through network logon. In other words, the application unit 61 is not limited to being implemented in the multi-antenna device, and may involve the software of the multi-antenna device as well as the external software for the on-line control of the multi-antenna device.

Figure 2A:
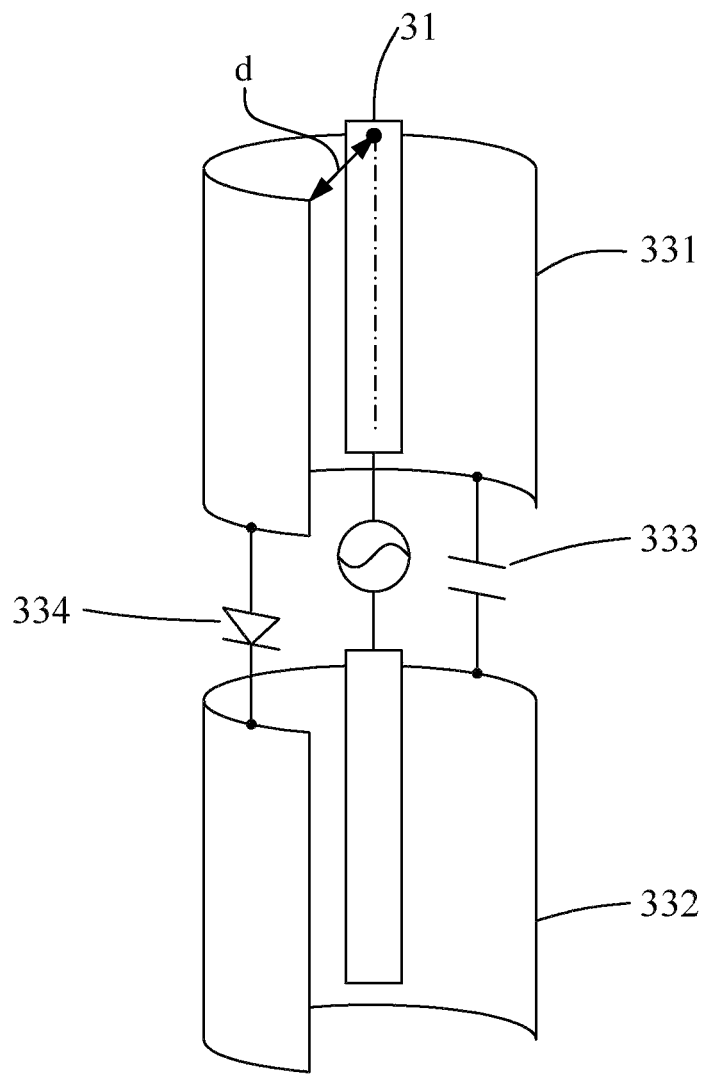
FIG. 2A is a schematic diagram of a main antenna and a first reflecting unit of an antenna unit provided in an embodiment of this disclosure.

Afterwards, please refer to FIG. 2A. The main antenna 31 generates a radiation pattern in a single polarization direction wherein the single polarization direction is parallel to the z-axis in FIG. 2A. The first reflecting unit 33 is parallel to the single polarization direction and partially surrounds the main antenna 31; that is, in FIG. 2A, the first reflecting unit 33 is parallel to the z-axis, and the projection of the path on the x-y plane, by which the first reflecting unit 33 surrounds the main antenna 31, partially surrounds the projection of the main antenna 31 on the x-y plane. With respect to the single polarization direction perpendicular to the main antenna 31 (i.e. on the x-y plane), the first reflecting unit 33 does not completely encircle the main antenna 31, otherwise the main antenna 31 is hard to emit an electromagnetic wave when the first reflecting unit 33 forms a reflector because the main antenna 31 is totally surrounded by the reflector in the x-y plane. The first reflecting unit 33 can be disposed on a flexible substrate for example (not shown in FIG. 2A). The first reflecting unit 33 comprises a first upper metal plate 331, a first lower metal plate 332, a first capacitor 333 and a first diode 334. When the first diode 334 is conducted, the first upper metal plate 331, the first lower metal plate 332, the first capacitor 333 and the first diode 334 form a first rectangular closed slot structure as a reflector of the main antenna 31.

When the first diode 334 does not conduct, the first upper metal plate 331, the first lower metal plate 332 and the first capacitor 333 form a first rectangular open slot structure which does not serve as the reflector of the main antenna. The principle of the first reflecting unit 33 is described later in the embodiment of FIG. 2B. The antenna control unit 4 is electrically connected to the first diode 334 of each of the antenna units 30 to output a plurality of first direct current control voltages (V1). The first direct current control voltages (V1) respectively correspond to the antenna units 30. Each of the plurality of first direct current control voltages (V1) is used for conducting the first diode 334 of the corresponding antenna unit 30.

Figure 2B:
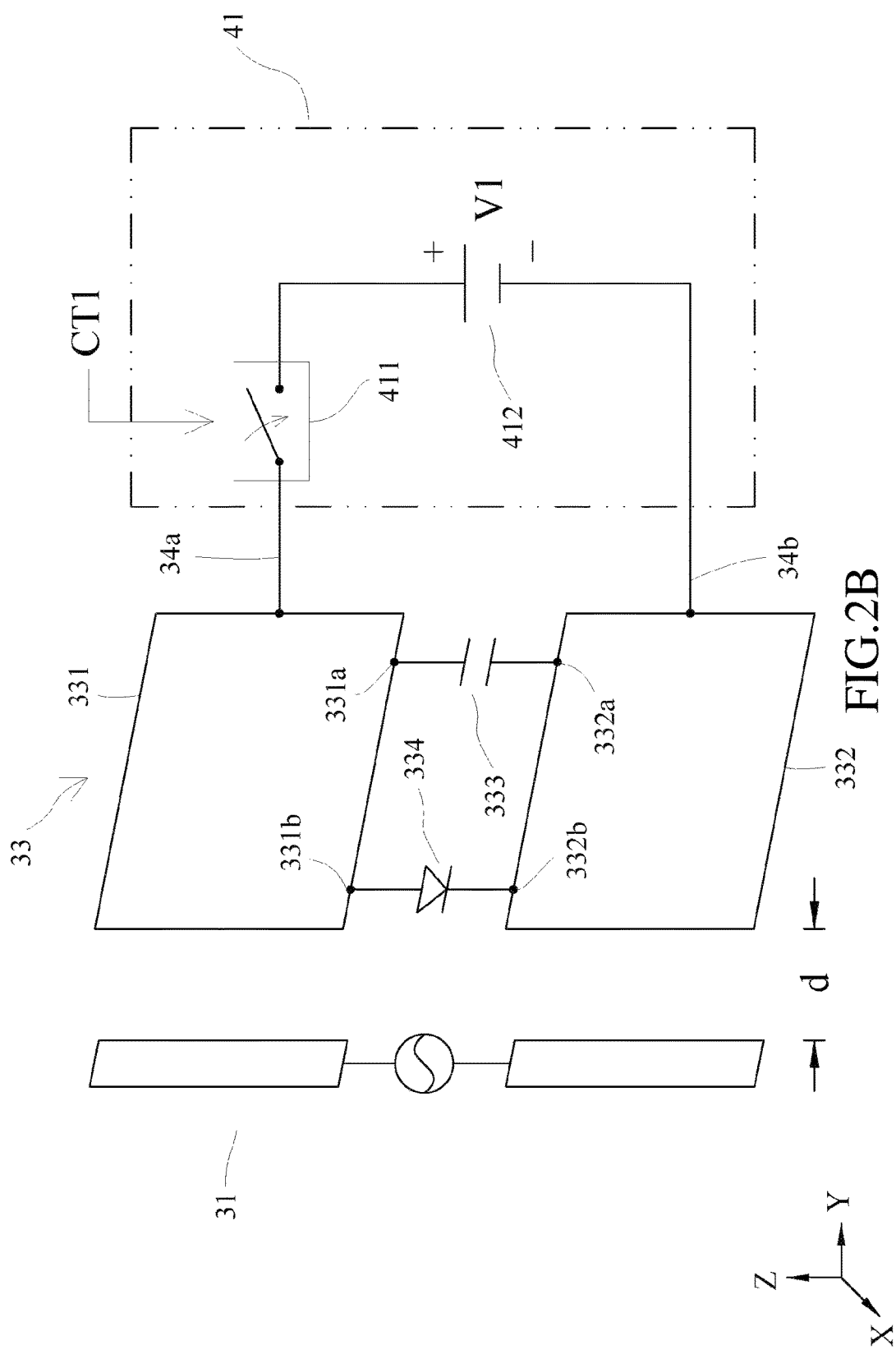
FIG. 2B is a structural diagram of a main antenna and a first reflecting unit of an antenna unit provided in an embodiment of this disclosure.

Please refer to FIG. 2A and FIG. 2B. In an embodiment of this disclosure, the modulation of the radiation pattern is achieved by switching the state of the first reflecting unit 33. The first reflecting unit 33 implements the reflection merely in the form of partially surrounding the main antenna 31. The first reflecting unit 33 surrounding the main antenna 31 in the x-y plane as shown in FIG. 2A is spread as shown in FIG. 2B, for explaining the operation mechanism of the first reflecting unit 33. The main antenna in FIG. 2A is a dipole antenna, such as a half-wave dipole antenna. Moreover, the main antenna 31 can also be replaced by a closed slot antenna.

Please refer to FIG. 2B. The main antenna 31 is mainly configured to generate a linear polarized radiation pattern. FIG. 2B shows the perpendicular polarized radiation pattern of a dipole antenna (the perpendicular polarized direction in FIG. 2B indication the direction parallel to the z axis). In FIG. 2B, the controller 41 is a part of the antenna control unit 4. The controller 41 is controlled by a first control signal CT1 from the microprocessor 5 to determine whether to output the first direct current control voltage V1 via a first conducting wire 34a and a second conducting wire 34b. The first direct current control voltage V1 allows the direct-current potential of the first conducting wire 34a is larger than that of the second conducting wire 34b. The first upper metal plate 331, first lower metal plate 332, first capacitor 333 and first diode 334 of the first reflecting unit 33 can be all disposed on a flexible substrate, such as flexible printed circuit board (FPCB). The first upper metal plate 331 and the first lower metal plate 332 can be fabricated by printed circuit technology, the first capacitor 333 and the first diode 334 can be mounted on the FPCB by surface-mount technology, and the first upper metal plate 331 and the first lower metal plate 332 are connected in the form as described later. The first upper metal plate 331 is electrically connected to the first conducting wire 34a. the underside of the first upper metal plate 331 has a first underside connection terminal 331a and a second underside connection terminal 331b. The first lower metal plate 332 is electrically connected to the second conducting wire 34b. The upper side of the first lower metal plate 332 has a first upper side connection terminal 332a and a second upper side connection terminal 332b. The first capacitor 333 has a first terminal and a second terminal. The first terminal of the first capacitor 333 is connected to the first underside connection terminal 331a of the first upper metal plate 331, and the second terminal of the first capacitor 333 is connected to the first upper side connection terminal 332a of the first lower metal plate 332. The first diode 334 has an anode terminal and a cathode terminal. The anode terminal of the first diode 334 is connected to the second underside connection terminal 331b of the first upper metal plate 331, and the cathode terminal of the first diode 334 is connected to the second upper side connection terminal 332b of the first lower metal plate 332. The distance d between the first reflecting unit 33 and the main antenna 31 (e.g. dipole antenna or closed slot antenna) is particularly 0.15 times to 0.5 times of the wavelength corresponding to the operation frequency of the main antenna 31 (i.e. 0.15λ to 0.5λ), but this disclosure does not be limited to this. In FIG. 2A, the first reflecting unit 33 forms a partial periphery with a radius of distance d between the first reflecting unit 33 and the axis of the main antenna 31 to surround the main antenna 31.

Figure 3A:
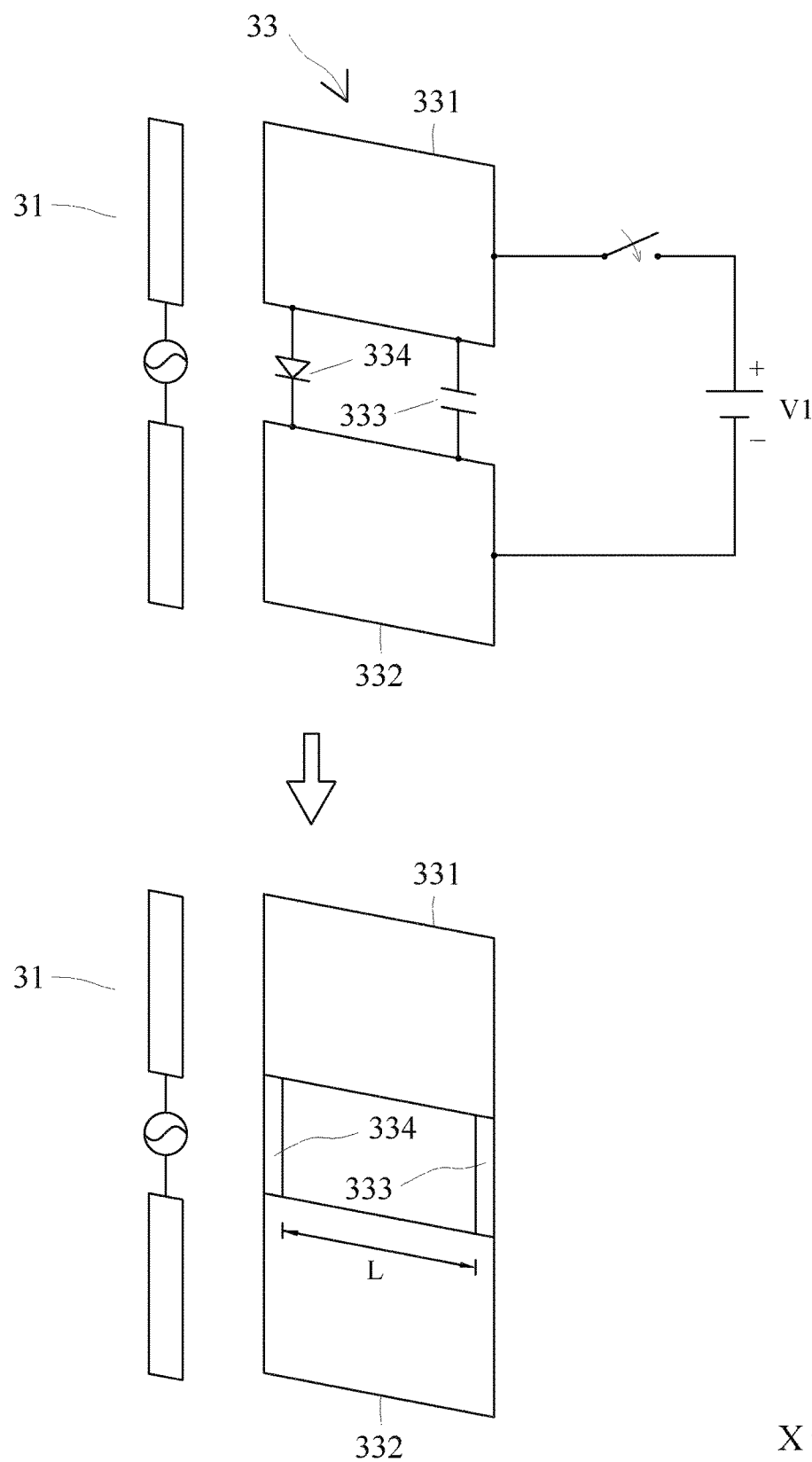
FIG. 3A is a schematic diagram of an antenna unit with a first diode in a conducted state according to an embodiment of this disclosure.
Figure 3B:
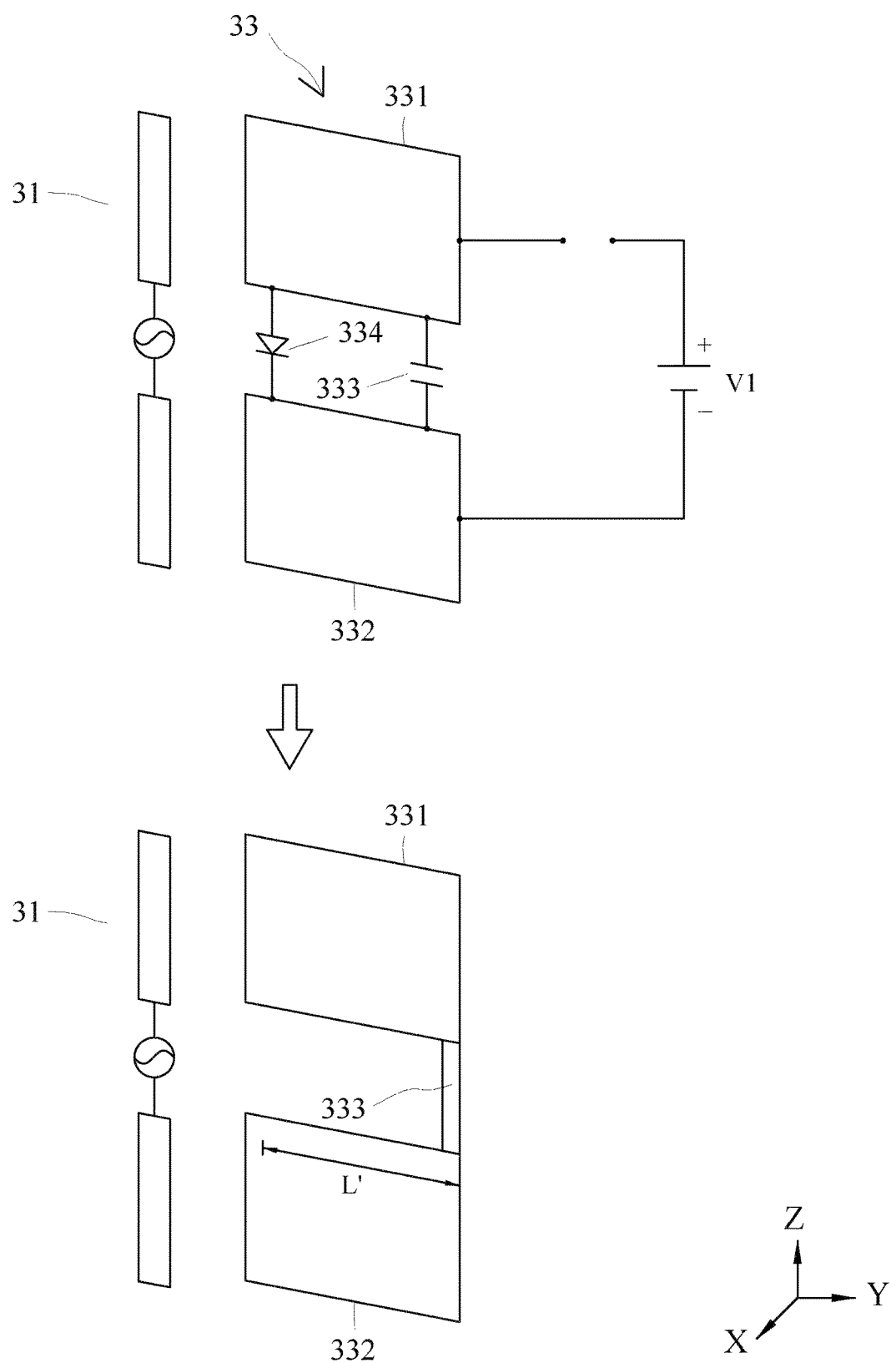
FIG. 3B is a schematic diagram of an antenna unit with a first diode in a cut-off state according to an embodiment of this disclosure.

The controller 41 comprises a switch 411 controlled by the first control signal CT1 and a direct current voltage source 4122. The switch 411 is configured to be switched to transmit or not to transmit the first direct current control voltage V1 of the direct current voltage source 412 to the first diode 334. The value of the first direct current control voltage V1 has to be larger than the breakover voltage (threshold voltage) value of the first diode 334. The first reflecting unit 33 has two states according to the conduction or disconduction of the first diode 334, and the two states are described as follows. In the first state of the first reflecting unit, when the controller 41 of the antenna control unit 4 outputs the first direct current control voltage V1 via the first conducting wire 34a and the second conducting wire 34b, the first diode 334 is conducted. Please refer to FIG. 3A which is a schematic diagram of an antenna unit with a first diode in a conducted state according to an embodiment of this disclosure. The first upper metal plate 331 and the first lower metal plate 332 have a connection therebetween via the first diode 334, and the first capacitor 334 is considered to be conducted at the operation frequency of the main antenna 31. Therefore, at the operation frequency of the main antenna 31, the first upper metal plate 331, the first lower metal plate 332, the first capacitor 333 and the first diode 334 form a first rectangular closed slot structure serving as the reflector of the main antenna 31. Please refer to FIG. 3A. The first rectangular closed slot structure is parallel to the main antenna 31. The long side L of the first rectangular closed slot structure is perpendicular to the single polarization direction of the main antenna 31 (the single polarization direction is parallel to the z axis in FIG. 3A). The length of the long side L of the first rectangular closed slot structure is a half of the wavelength (i.e. 0.5λ) which corresponds to an operating frequency of the main antenna 31. Based on the half wavelength slot structure of the first rectangular closed slot, the main antenna 31 induces a current on the first rectangular closed slot structure, so that the first rectangular closed slot becomes a resonant reflector, the whole radiation pattern is influenced, and the first reflecting unit produces a reflection. In the practical application, for example, when the main antenna 31 is operated at 2.4 GHz, the length of the long side L of the first rectangular closed slot structure is about 62 millimeter (mm) (i.e. a half of the wavelength of an electromagnetic wave in a vacuum). If the permittivity of the flexible microwave substrate is increased, the actual length of the long side L can be further decreased according to the increased permittivity. In the second state of the first reflecting unit 33, when the controller 41 of the antenna control unit 4 does not output the first direct current control voltage V1 via the first conducting wire 34a and the second conducting wire 34b, the first diode 334 is not conducted. Please refer to FIG. 3B which is a schematic diagram of an antenna unit with a first diode in a cut-off state according to an embodiment of this disclosure. At the operation frequency of the main antenna 31, the first upper metal plate 331 and the first lower metal plate 332 have a connection therebetween via the first capacitor 333, so that the first upper metal plate 331, the first lower metal plate 332 and the first capacitor 333 form a first rectangular open slot structure wherein the location of the first diode 334 indicates the opening of this open slot structure. The length of the long side L' of the first rectangular open slot structure (similar to the long side L of the first rectangular closed slot structure) is a quarter of a wavelength corresponding to a half of the operation frequency of the main antenna 31. Based on the quarter wavelength open slot structure of the first rectangular closed slot, for example, when the main antenna 31 is operated at 2.4 GHz, the first rectangular open slot structure is a quarter wavelength open slot structure which has an operating frequency of 1.2 GHz and is not a resonant reflector belonging to the frequency of 2.4 GHz. Therefore, although the main antenna 31 induces a current on the first rectangular open slot structure, the current on the first rectangular open slot structure does approximately not influence the radiation pattern of the main antenna.

In another embodiment, the antenna control unit 4 in FIG. 1 is controlled by the microprocessor 5. The microprocessor 5 not only determines whether the antenna control unit 4 outputs the plurality of first direct current control voltages or not (as described in the above embodiment), but also determines whether the antenna control unit 4 outputs a plurality of second direct current control voltages or not. In this embodiment, each antenna unit 30 as shown in FIG. 1 comprises the first reflecting unit 33 and further comprises a second reflecting unit parallel to the single polarization direction and partially surrounding the main antenna 31. The operation mechanism of the second reflecting unit is the same as that of the first reflecting unit 33 as shown in FIG. 2A. The second reflecting unit comprises a second upper metal plate, a second lower metal plate, a second capacitor and a second diode, wherein the second upper metal plate, the second lower metal plate, the second capacitor and the second diode are respectively similar to the first upper metal plate 331, the first lower metal plate 332, the first capacitor 333 and the first diode 334 as shown in FIG. 2A. More specifically, each of the second direct current control voltages is transmitted to the second diode of the respective one antenna unit in one-to-one method. When the second diode receives a respective one of the plurality of second direct current control voltages so as to be conducted, the second upper metal plate, the second lower metal plate, the second capacitor and the second diode form a second rectangular closed slot structure as the reflector of the main antenna. In contrast, when the second diode is not conducted, the second upper metal plate, the second lower metal plate and the second capacitor form a second rectangular open slot structure which does not serve as said another reflector of the main antenna. Furthermore, similar to the operation mechanism of the first reflecting unit as shown in FIG. 2B, the second upper metal plate of the second reflecting unit is electrically connected to the controller of the antenna unit via a third conducting wire (as the first conducting wire 34a). The underside of the second upper metal plate has a first underside connection terminal and a second underside connection terminal. The second lower metal plate is electrically connected to the controller of the antenna control unit via a fourth conducting wire (as the second conducting wire 34b). The upper side of the second lower metal plate has a first upper side connection terminal and a second upper side connection terminal. The second capacitor has a first terminal and a second terminal wherein the first terminal of the second capacitor is connected to the first underside connection terminal of the second upper metal plate, and the second terminal of the second capacitor is connected to the first upper side connection terminal of the second lower metal plate. The second diode has an anode terminal and a cathode terminal wherein the anode terminal of the second diode is connected to the second underside connection terminal of the second upper metal plate, and the cathode terminal of the second diode is connected to the second upper side connection terminal of the second lower metal plate. Particularly, the distance d between the second reflecting unit and the main antenna 31 is 0.15 times to 0.5 times of the wavelength corresponding to the operation frequency of the main antenna 31 (i.e. 0.15λ to 0.5λ), but this disclosure does not be limited to this. The second reflecting unit forms a partial periphery with a radius of distance d between the second reflecting unit and the axis of the main antenna 31 to surround the main antenna 31. When the controller of the antenna control unit (4) outputs the second direct current control voltages via the third and fourth conducting wires, the second diode is conducted so as to allow the second upper metal plate, the second lower metal plate, the second capacitor and the second diode to form the second rectangular closed slot structure, with the second rectangular closed slot structure parallel to the main antenna. The long side of the second rectangular closed slot structure is perpendicular to the single polarization direction of the main antenna, and the length of the long side of the second rectangular closed slot structure is a half of a wavelength which corresponds to an operating frequency of the main antenna. When the controller of the antenna control unit (4) does not output the second direct current control voltages via the third conducting wire and the fourth conducting wire, the second diode is not conducted so that the second upper metal plate, the second lower metal plate and the second capacitor form the second rectangular open slot structure. When the second upper metal plate, the second lower metal plate and the second capacitor form the second rectangular open slot structure, the length of the long side of the second rectangular open slot structure is a quarter of a wavelength corresponding to a half of the operation frequency of the main antenna. Based on the above description, the above technical features of the second reflecting unit are easily interpreted as the first reflecting unit 33 in FIG. 2B, so the related details are not repeated and the similar figure are also omitted. The first reflecting unit (33) and the second reflecting unit are disposed to individually and partially surround the main antenna (31), and controlled by the antenna control unit (4) which is controlled by the microprocessor (5) to control the radiation pattern of the main antenna (31) individually or jointly.

Regarding the above description, it is to be further recited that the antenna unit in one or more embodiment of this disclosure comprises a main antenna and one or more reflecting units. Each reflecting unit is parallel to the signal polarization direction of the main antenna, and independently and partially surrounds the main antenna. The reflecting units can individually or jointly change the radiation pattern of the main antenna. The aforementioned first reflecting unit and second reflecting unit are merely exemplified, and this disclosure does not intend to limit the number of the reflecting units included in the antenna unit (30).

Figure 4:
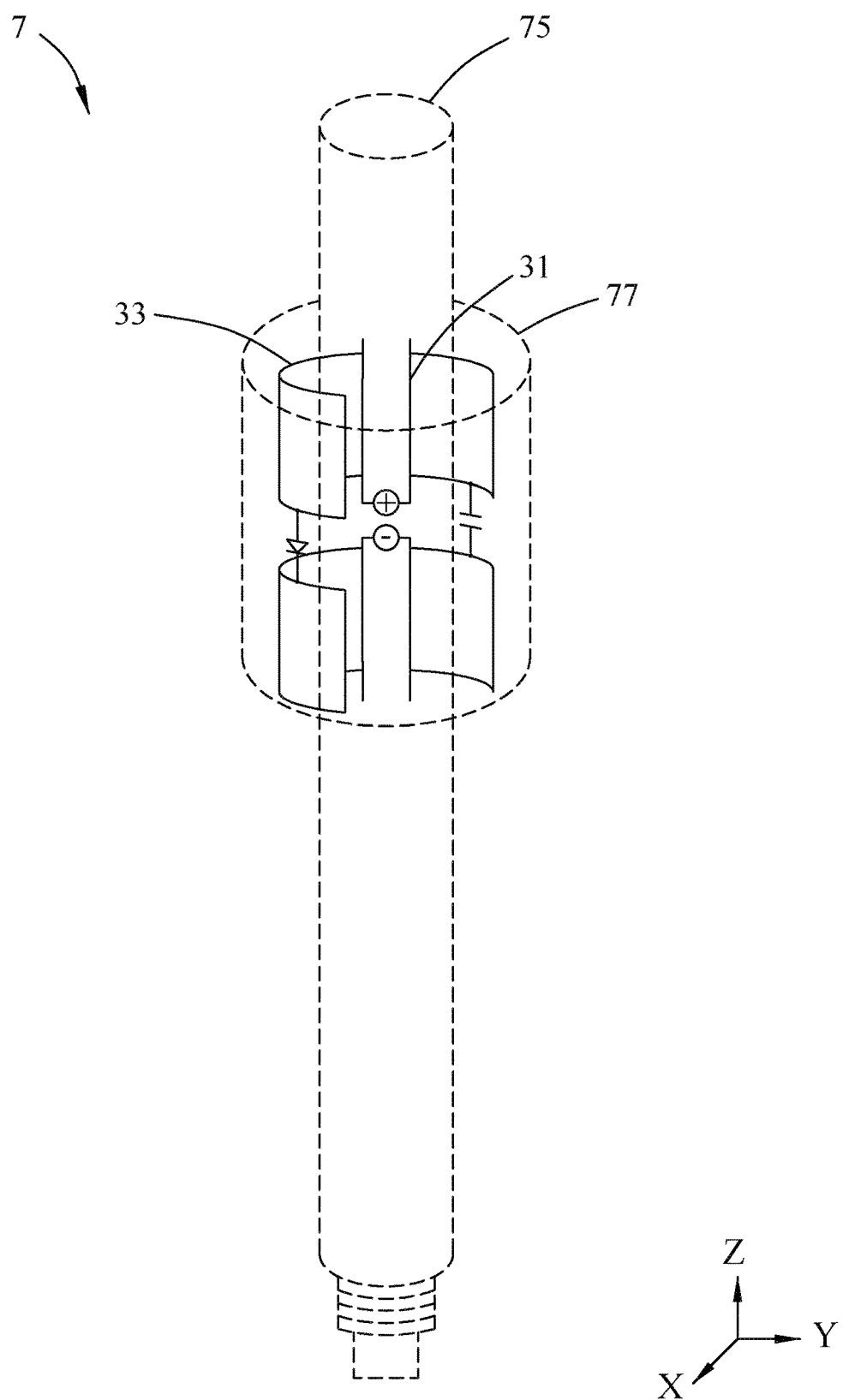
FIG. 4 is a schematic diagram of an antenna unit serving as an exposed antenna provided in an embodiment of this disclosure.

Afterwards, please refer to FIG. 4 which is a schematic diagram of an antenna unit serving as an exposed antenna provided in an embodiment of this disclosure. The exposed antenna 7 comprises a first shell 75 and a second shell 77 wherein the first shell 75 is roughly a long straight rod (parallel to the z axis) and the radius of the second shell is twice as large as that of the first shell 75. The main antenna 31 of the antenna unit is disposed in the first shell 75, and the first reflecting unit 33 is disposed in the second shell 77. The main antenna 31 is a half-wavelength dipole antenna with two positive pole branches and two negative pole branches. The feeder part of the main antenna 31 is omitted in the figures. In the second shell 77, the first reflecting unit 33 partially surrounds the main antenna 31 in the form as shown in FIG. 2A. The aforementioned exposed antenna 7 can be applied to various multi-antenna devices, such as a set-top box, wireless network base station, wireless router and another wireless electronic device with multiple antennas, but this disclosure is not limited to these. In another embodiment, the first shell 75 for accommodating the main antenna 31 and the second shell 77 for accommodating the first reflecting unit 33 can be integrated into a single shell for accommodating both the main antenna 31 and the first reflecting unit 33. The shells in different forms have different volumes and appearances. The form of a shell is designed usually based on the consideration for decreasing the whole volume (or the diameter) of the exposed antenna, or for enhancing the appearance of the product.

In view of the above description, the control module and the multi-antenna device with said control module provided in one or more embodiments of this disclosure uses the control module independent from the wireless chip to control the properties of a plurality of antennas operated by the wireless chip so as to enhance the performance of multi-antenna operation. Thereby, the purpose of enhancing the communication performance of the whole multi-antenna device may be achieved, and simultaneously, the design of the wireless chip (including the version, specification, performance, etc.) may avoid being changed. The design of the wireless chip does not have to consider the design of the antennas of various application, and the design of a multi-antenna device does also not have to be adapted to the existing function or algorithm of the wireless chip, so that the cost for changing the design of the wireless chip may be reduced, and various multi-antenna devices may use a common wireless chip. Moreover, the flexibility and the changes in the performance of the multi-antenna design are implemented by the application unit mounted in the operating system of the multi-antenna device and the microprocessor that can independently operate. One or more embodiments of this disclosure provide a solution applied to a multi-antenna device for a low cost and the maintenance of the diversity of antenna performance.

The foregoing is merely the embodiments of this disclosure and does not intend to limit the scope of this disclosure.

What is claimed is:

1. A control module, configured to be installed in a multi-antenna device which has a wireless chip, comprising:
    a multi-antenna system comprising a plurality of antenna units which are configured to connect to the wireless chip of the multi-antenna device, each of the plurality of antenna units comprising a main antenna and a first reflecting unit, the main antenna configured to generate a radiation pattern in a single polarization direction, the first reflecting unit parallel to the single polarization direction, partially surrounding the main antenna, and comprising a first upper metal plate, a first lower metal plate, a first capacitor and a first diode, wherein when the first diode is conducted, the first upper metal plate, the first lower metal plate, the first capacitor and the first diode form a first rectangular closed slot structure as a reflector of the main antenna, and when the first diode does not be conducted, the first upper metal plate, the first lower metal plate, and the first capacitor forms a first rectangular open slot structure which does not serve as the reflector of the main antenna;
    an antenna control unit electrically connected to the first diode of each of the plurality of antenna units, and configured to output a plurality of first direct current control voltages, the plurality of first direct current control voltages respectively corresponding to the plurality of antenna units, and each of the plurality of first direct current control voltages configured to conduct the first diode of one of the antenna units;
    an application unit configured to obtain signal strength of the plurality of antenna units or data receiving rates corresponding to the plurality of antenna units from the wireless chip; and
    a microprocessor connected to the antenna control unit, controlled by the application unit, and according to the signal strength or the data receiving rate and associating with an algorithm processing procedure, controlling the antenna control unit to conduct or not to conduct the first diode of at least one of the plurality of antenna units for changing a radiation pattern of the multi-antenna system so as to enhance communication performance.

2. The control module according to claim 1, wherein the plurality of antenna units of the multi-antenna system is formed in a specific geometric arrangement, and each of the plurality of antenna units changes the radiation pattern of the main antenna thereof by a switching, scanning or adaptive method.

3. The control module according to claim 1, wherein the main antenna is a slot antenna or a dipole antenna.

4. The control module according to claim 1, wherein an underside of the first upper metal plate has a first underside connection terminal and a second underside connection terminal, and an upper side of the first lower metal plate has a first upper side connection terminal and a second upper side connection terminal; wherein the first capacitor has a first terminal and a second terminal, the first terminal of the first capacitor is connected to the first underside connection terminal of the first upper metal plate, and the second terminal of the first capacitor is connected to the first upper side connection terminal of the first lower metal plate; wherein the first diode has an anode terminal and a cathode terminal, the anode terminal of the first diode is connected to the second underside connection terminal of the first upper metal plate, and the cathode terminal of the first diode is connected to the second upper side connection terminal of the first lower metal plate; wherein for each of the plurality of antenna units, when the antenna control unit outputs a respective one of the plurality of first direct current control voltages, the first diode is conducted so as to allow the first upper metal plate, the first lower metal plate, the first capacitor and the first diode to form the first rectangular closed slot structure, with the first rectangular closed slot structure parallel to the main antenna, a long side of the first rectangular closed slot structure being perpendicular to the single polarization direction, and a length of the long side of the first rectangular closed slot structure is a half of a wavelength which corresponds to an operating frequency of the main antenna; and wherein for each of the plurality of antenna units, when the antenna control unit does not output the respective one of the plurality of first direct current control voltages, the first diode is not conducted so that the first upper metal plate, the first lower metal plate and the first capacitor form the first rectangular open slot structure.

5. The control module according to claim 4, wherein when the first upper metal plate, the first lower metal plate and the first capacitor form the first rectangular open slot structure, a length of a long side of the first rectangular open slot structure is a quarter of a wavelength corresponding to a half of the operation frequency of the main antenna.

6. The control module according to claim 1, wherein the antenna control unit is controlled by the microprocessor to determine whether to output a plurality of second direct current control voltages, each of the plurality of antenna units further comprises a second reflecting unit which is parallel to the single polarization direction and partially surrounds the main antenna, the second reflecting unit comprises a second upper metal plate, a second lower metal plate, a second capacitor and a second diode, each of the plurality of second direct current control voltages are transmitted to the second diode of a respective one of the plurality of antenna units, when the second diode receives a respective one of the plurality of second direct current control voltages so as to be conducted, the second upper metal plate, the second lower metal plate, the second capacitor and the second diode form a second rectangular closed slot structure as another reflector of the main antenna, and when the second diode is not conducted, the second upper metal plate, the second lower metal plate and the second capacitor form a second rectangular open slot structure which does not serve as said another reflector of the main antenna.

7. The control module according to claim 6, wherein a underside of the second upper metal plate has a first underside connection terminal and a second underside connection terminal, and a upper side of the second lower metal plate has a first upper side connection terminal and a second upper side connection terminal; wherein the second capacitor has a first terminal and a second terminal, the first terminal of the second capacitor is connected to the first underside connection terminal of the second upper metal plate, and the second terminal of the second capacitor is connected to the first upper side connection terminal of the second lower metal plate; wherein the second diode has an anode terminal and a cathode terminal, the anode terminal of the second diode is connected to the second underside connection terminal of the second upper metal plate, and the cathode terminal of the second diode is connected to the second upper side connection terminal of the second lower metal plate; wherein for each of the plurality of antenna units, when the antenna control unit outputs a respective one of the plurality of second direct current control voltages, the second diode is conducted so as to allow the second upper metal plate, the second lower metal plate, the second capacitor and the second diode to form the second rectangular closed slot structure, with the second rectangular closed slot structure parallel to the main antenna, a long side of the second rectangular closed slot structure being perpendicular to the single polarization direction, and a length of the long side of the second rectangular closed slot structure is a half of a wavelength which corresponds to an operating frequency of the main antenna; and wherein for each of the plurality of antenna units, when the antenna control unit does not output the respective one of the plurality of second direct current control voltages, the second diode is not conducted so that the second upper metal plate, the second lower metal plate and the second capacitor form the second rectangular open slot structure.

8. The control module according to claim 7, wherein when the second upper metal plate, the second lower metal plate and the second capacitor form the second rectangular open slot structure, a length of a long side of the second rectangular open slot structure is a quarter of a wavelength corresponding to a half of the operation frequency of the main antenna.

9. A multi-antenna device with a control module, comprising:
the control module according to claim 1; and
a wireless chip connected to the main antenna of each of the plurality of antenna units, obtaining signals of the plurality of antenna units, and obtaining the signal strength of the plurality of the antenna units or the data receiving rate corresponding to the plurality of antenna units.

10. The multi-antenna device with the control module according to claim 9, wherein the multi-antenna device is notebook, laptop, tablet, all-in-one personal computer, smart television, small cell, wireless router or smart phone.

* * * * *